R. S. WARING.

BRANCHING ELECTRIC CABLES.

No. 10,459. Reissued Mar. 11, 1884.

WITNESSES:

A. H. Whittemore

C. M. Clark

INVENTOR, RICHARD S. WARING.

BY ATTORNEY, George H. Christy

UNITED STATES PATENT OFFICE.

RICHARD S. WARING, OF PITTSBURG, PENNSYLVANIA.

BRANCHING ELECTRIC CABLES.

SPECIFICATION forming part of Reissued Letters Patent No. 10,459, dated March 11, 1884.

Original No. 268,159, dated November 28, 1882. Application for reissue filed December 22, 1883.

DIVISION B.

*To all whom it may concern:*

Be it known that I, RICHARD S. WARING, a citizen of the United States, residing at Pittsburg, county of Allegheny, State of Pennsylvania, have invented or discovered a new and useful Improvement in Branching Electric Cables; and I do hereby declare the following to be a full, clear, concise, and exact description thereof, reference being had to the accompanying drawings, making part of this specification, in which—like letters indicating like parts—

Figure 1:
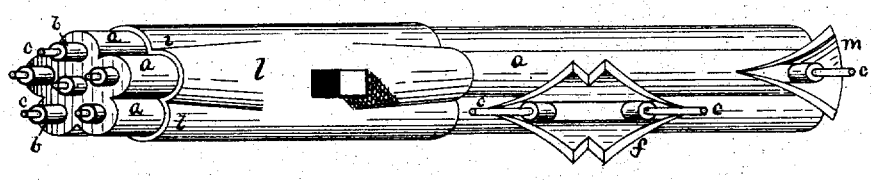
Figure 2:
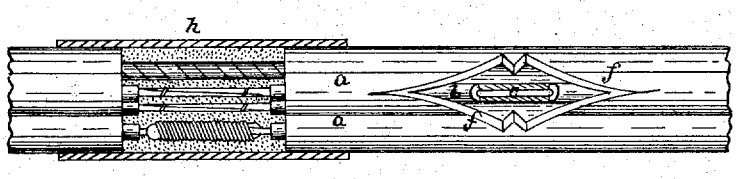
Figure 3:
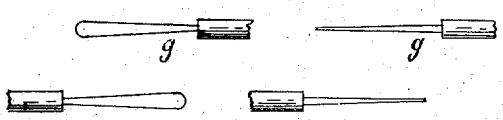

Figure 1 represents an elevation of a section of cable, showing the method of connecting sections of cables and of branching one or more of the conductors at any desired point. Fig. 2 represents a view partly in side elevation and partly in longitudinal section, showing the manner of connecting the wires, and also the initial steps of the method of branching the insulated wires or conductors. Fig. 3 represents views of the flattened wires.

This invention relates to certain improvements in that class of cables for the transmission of electric currents which are composed of insulated wires surrounded by an armor of lead or other ductile material, the said armor being formed with longitudinal ribs, with the insulated wires or conductors extending through them, and which may also be provided with a central or longitudinal insulated wire or group of wires.

My invention consists in an improved method of forming branch connections at any point in the cable or section thereof by cutting through one or more of the ribs transversely and longitudinally a suitable distance, opening the parts outward, then severing the insulated conductor, bending the ends so formed outward, and closing the divided parts of the armoring thus opened, and soldering the same.

The cable is constructed of an armor, of lead or other ductile material, provided with a series of longitudinal ribs, *a*, through which extend longitudinally the wires or conductors *c*, surrounded with insulating material *b*. The grooves *k* between the ribs may be of any desired shape or depth, and the armor may be provided with a central longitudinal passage, which may be corrugated or plain, for a group of insulated wires or conductors, or a single heavy wire or conductor sufficiently large to convey the strong currents necessary for electric motors or the production of the electric light or other like purposes. In order to form intermediate branches, the ribs are cut longitudinally and transversely, as shown in Figs. 1 and 2, forming lips *f*, which are bent outward laterally, exposing the wire or conductor, which is denuded of its insulating material, as shown at *e*, Fig. 2. The wire or conductor is then cut, and the ends are bent outward, as shown in Fig. 1, after which the lips are bent back into place and soldered, leaving the wires or conductors projecting at right angles or otherwise, to be united to any desired branch line. In uniting these turned-out ends *c* to the branch conductors, I may flatten the ends *c* and the ends of the branch, as shown in Fig. 3, and then place the flattened ends together, and secure them in that position by wrapping the lapped ends with wire, and cover the whole joint with solder, and finally cover the whole joint with insulating material. A small tube, of lead or other suitable material, may be placed over each branch and soldered to the cable. To connect the wires or conductors of the different sections, the said wires are denuded and flattened at their ends, as indicated in Fig. 2 of the drawings by the letter *g*. To further secure the connection, the matched ends of the wires or conductors are bound with fine copper or other wire, or with fibrous material, and in the latter case a strip of lead is placed upon the wrapping, so as to connect with the armor to carry off the induced currents. When thus connected, the armor of the section is united by means of a thin sheet of lead, *h*, which is preferably corrugated, to correspond with the corrugations of the sections, the said sheet being bent into the form of a sleeve having its edges lap-jointed and then soldered. An opening, *l*, having a flap, is formed in the side of the sleeve *h*, and after the sections have been connected insulating material is filled in through said opening, embedding the connected ends of the wires, thus insuring thorough insulation. After filling, the flap is closed and soldered, and the union will be complete.

In so far as relates to the method of joining two sections of cables herein shown and described, the same is not herein claimed, but forms the subject-matter of another division of this application.

I claim herein as my invention—

1. The method of providing for branch connections with one or more of the conductors of a lead-armored cable, which consists in removing the lead armor from around the conductor to be branched, severing said conductor, and bending the severed ends outward, substantially as described.

2. The method of providing for branch connections with one or more of the conductors of a lead-armored cable, which consists in cutting through the armor transversely and longitudinally a suitable distance, opening the divided parts out, severing the conductor, and bending each of the ends outward, and finally closing the parts of the armor, substantially as set forth.

In witness whereof I have hereunto set my hand.

RICHARD S. WARING.

Witnesses:

D. RITTENHOUSE,

W. H. A. WORMLEY.